United States Patent Office.

WILLIAM MANNING, OF HOLYOKE, ASSIGNOR TO THOMAS MANNING, OF BOSTON, MASSACHUSETTS.

PROCESS OF TREATING GYPSUM.

SPECIFICATION forming part of Letters Patent No. 326,047, dated September 8, 1885.

Application filed October 23, 1884. (No specimens.)

*To all whom it may concern:*

Be it known that I, WILLIAM MANNING, a citizen of the United States, residing at Holyoke, in the county of Hampden and State of Massachusetts, have invented a new and useful Improvement in the Process of Treating Gypsum, of which the following is a specification.

My invention relates to an improvement in the process of preparing gypsum, or the sulphate of lime of commerce, for use in the manufacture of paper and for other purposes.

I am aware that gypsum has been reduced to a great degree of fineness by being subjected to grinding and calcination, and also that the same has been agitated by water; but this has been found to be impracticable and inoperative, first, by being in a thin solution it cannot be readily handled; secondly, being in a wet state, it is too expensive in transportation; and, further, the gypsum thus treated will not hold in suspension long enough to become thoroughly intermingled with the pulp in the manufacture of paper.

My invention consists in an improved process, in addition to and proceeding beyond that now in use, or purporting to be, whereby the disintegrated gypsum can be practically used in the manufacture of paper, and without which the process described in Patents No. 177,301, and Reissue of same, No. 8,803, of C. T. Tomkins, is useless and inoperative.

In carrying out my invention I first employ the usual method of crushing the gypsum or sulphate of lime, then grinding it and subjecting it to the usual process of calcining. This product is then placed in a tank of water and thoroughly agitated until it is free from a tendency to set, the agitation being continued for half an hour, more or less. I then float or levigate the same in a suitable apparatus for the purpose, by which the impure foreign matter is precipitated, leaving the disintegrated gypsum in a pure crystalline state. The water in which the gypsum is contained is then forced through a filter-press, leaving the gypsum in a moist condition, and containing about fifty per cent. of water, and in the form of cakes, which are then subjected to a heat sufficiently great to cause the water in the same to entirely evaporate and leave the said cakes in a hard dry state. These cakes are then crushed and ground, leaving an impalpable precipitated powder in a fine dry state. The powder thus produced is then packed in casks or barrels for transportation, and as the weight in bulk is very much reduced the article is enabled to be brought into very general use.

What I claim as my invention is—

1. The process of treating gypsum herein described, the same consisting in subjecting the gypsum to grinding, calcining, and agitating in water, then floating the same in a floating apparatus to effect purification, then forcing it through a filter-press, and afterward subjecting it to heat to effect drying, and finally crushing and grinding the same to an impalpable powder, substantially as set forth.

2. As a new article of manufacture, alabaster in the form of a dry precipitated powder made and prepared as above set forth.

In testimony whereof I have signed my name to this specification in the presence of two subscribing witnesses.

WILLIAM MANNING.

Witnesses:
J. H. ADAMS,
E. PLANTA.